(12) United States Patent
Boie et al.

(10) Patent No.: US 7,435,961 B2
(45) Date of Patent: Oct. 14, 2008

(54) IMAGING SENSOR

(75) Inventors: Robert Albert Boie, Bridport, VT (US); Cristian A Bolle, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 410 days.

(21) Appl. No.: 11/378,169

(22) Filed: Mar. 17, 2006

(65) Prior Publication Data

US 2007/0215805 A1    Sep. 20, 2007

(51) Int. Cl.
*G01J 5/00* (2006.01)
(52) U.S. Cl. .................................................. 250/338.1
(58) Field of Classification Search .... 250/338.1–338.5
See application file for complete search history.

(56) References Cited

U.S. PATENT DOCUMENTS

2006/0114551 A1 * 6/2006 Okada et al. ................ 359/350

OTHER PUBLICATIONS

Tsaur et al., PtSi Schottky-Barrier Focal Plane Arrays for Multispectral Imaging in UV, Visible, and IR Spectral Bands, 1990 IEEE Electron Device Letters, vol. 11, No. 4, Apr. 1990, pp. 162-164.*

B. E. Cole et al., "Monolithic Two-Dimensional Arrays Of Micromachined Microstructure For Infrared Applications", *Proceedings of the IEEE.*, vol. 86, No. 8, Aug. 1998, pp. 1679-1686.

* cited by examiner

*Primary Examiner*—David p. Porta
*Assistant Examiner*—Kiho Kim
(74) *Attorney, Agent, or Firm*—Eugene J. Rosenthal

(57) ABSTRACT

A sensor that is responsive to at least two distinct spectral bands, e.g., infrared radiation and ultraviolet or infrared and visible light makes use of the junction of a diode-based bolometer as a photocell in addition to its temperature dependence for detecting infrared radiation. More specifically the diode bolometer is arranged to work in the conventional manner, in that an electrical characteristic of the diode, e.g., the temperature dependence of its current-voltage (I-V) curve, is used as the basis for measuring temperature, and hence, infrared radiation. Additionally, the same diode may be operated as a photocell to detect radiation that is capable of interacting with the electrons in the junction of the diode. This may be achieved by detecting a change in the operating point of the diode based given its present biasing in response to noninfrared radiation incident upon the diode.

20 Claims, 7 Drawing Sheets

IMAGING SENSOR

TECHNICAL FIELD

This invention relates to imaging sensors.

BACKGROUND OF THE INVENTION

A bolometer is a sensor that is used to measure infrared radiation. An array of bolometers, along with appropriate optics and electronics, may be used to generate an electrical representation of a scene as it appears in the infrared spectral region. A bolometer typically has a thermistor, i.e., a resistor that changes its resistivity with temperature, mounted offset from a substrate so that it is essentially thermally decoupled from the substrate. Infrared radiation that is incident upon the thermistor changes the temperature, and hence the resistivity of the thermistor, and the corresponding change in resistance across the thermistor can be measured, to provide an indication of the intensity of the infrared radiation that is incident on the thermistor.

SUMMARY OF THE INVENTION

Bolometers used in imaging arrays are preferably relatively small, e.g., as disclosed in *Monolithic Two-Dimensional Arrays of Micromachined Microstructures for Infrared Applications*, by B. E. Cole, R. E. Higashi, and R. A. Wood, published in the Proceedings of the IEEE, Vol. 86, No. 8, August 1998. Unfortunately, such arrays suffer from self-heating during the resistance measurement process, because large currents must be used to bias each thermistor of the array of bolometers to obtain a sensitive temperature measurement from each bolometer. The minimum change in the temperature of the thermistor in a bolometer that can be detected is called the temperature resolution of the bolometer and it is a function of the supplied bias current. Disadvantageously, the properties of the bolometer are changed as a result of the self-heating, making obtaining accurate temperature readings difficult. Further disadvantageously, bolometers only operate in the infrared band. Yet further disadvantageously, the typical material that is used to make up the thermistors, namely, vanadium oxide ($VO_x$), is relatively expensive and difficult to process.

Another approach to measuring temperature in the prior art was to use a diode in lieu of a thermistor in a bolometer. More specifically, a conventional silicon diode offset from a substrate is biased with a constant current, and the voltage drop across the diode, which is a complicated function of the temperature of the diode, is measured. To obtain good results when diodes were used in an array as an imaging system in the prior art, each diode needed to be individually calibrated, by developing for each diode its own voltage versus temperature curve. Disadvantageously, doing so is time consuming and must be done in a controlled environment, and hence is expensive.

We have recognized that both thermistor- and diode-based bolometers were only configured to detect a single band of radiation, e.g., the far infrared band, but not two bands, such as the far infrared in combination with a second band such as a) the near infrared, b) the visible or c) the ultraviolet. We have recognized that a sensor that is responsive to at least two distinct spectral bands, e.g., 1) a) infrared radiation and b) ultraviolet or 2) a) infrared and b) visible light, may be achieved, in accordance with the principles of the invention, by making use of the junction of a diode-based bolometer as a photocell in addition to its temperature dependence for detecting infrared radiation. More specifically the diode bolometer is arranged to work in the conventional manner, in that an electrical characteristic of the diode, e.g., the temperature dependence of its current-voltage (I-V) curve, is used as the basis for measuring temperature, and hence, infrared radiation. Additionally, the same diode may be operated as a photocell to detect radiation that is capable of interacting with the electrons in the junction of the diode. This may be achieved by detecting a change in the operating point of the diode given its present biasing in response to noninfrared radiation incident upon the diode. Furthermore, calibration of the diode for measuring temperature may be avoided by a measurement procedure that employs pairs of measurements each of which is based on the use of a different biasing current.

Advantageously, a dual-band imaging sensor may be formed from an array of diode-based bolometers.

DETAILED DESCRIPTION

Figure 1:
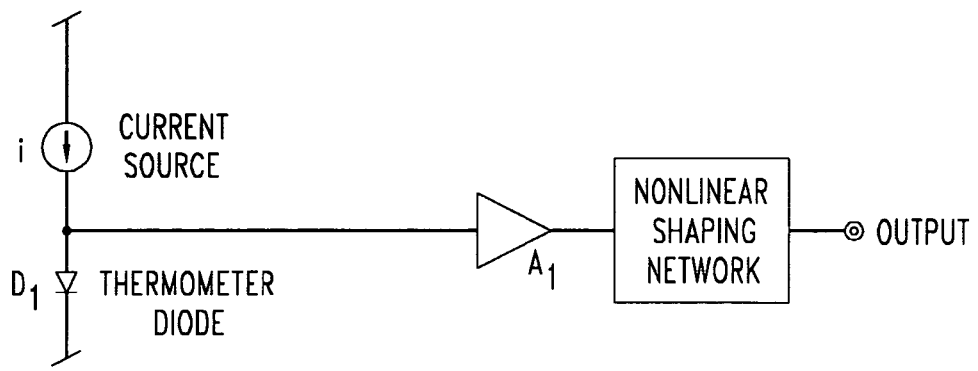
FIG. 1 shows an exemplary diode-based thermometer.

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Additionally, unless otherwise explicitly specified herein, any lens shown and/or described herein is actually an optical system having the particular specified properties of that lens. Such an optical system may be implemented by a single lens element but is not necessarily limited thereto. Similarly, where a mirror is shown and/or described what is actually being shown and/or described is an optical system with the specified properties of such a mirror, which may be implemented by a single mirror element but is not necessarily limited to a single mirror element. This is because, as is well known in the art, various optical systems may provide the same functionality of a single lens element or mirror but in a superior way, e.g., with less distortion. Furthermore, as is well known in the art, the functionality of a curved mirror may be realized via a combination of lenses and mirrors and vice versa. Moreover, any arrangement of optical components that are performing a specified function, e.g., an imaging system, gratings, coated elements, and prisms, may be replaced by any other arrangement of optical components that perform the same specified function. Thus, unless otherwise explicitly specified here, all optical elements or systems that are capable of providing specific function within an overall embodiment disclosed herein are equivalent to one another for purposes of the present disclosure.

In the description, identically numbered components within different ones of the FIGS. refer to the same components.

By way of introduction, the basis for the use of a semiconductor p-n junction as a thermometer lies in the well-known temperature dependence of its current-voltage (I-V) characteristic, in that $$I = I_0(T)\{e^{qV/kT} - 1\} \tag{1}$$

where
I=diode current;
$I_0(T)$=reverse saturation current;
V=bias voltage;
k=Boltzmann's constant; and
T=absolute temperature.

However, in actuality, equation (1) is an idealization, and real diodes are usually better described by the semiempirical relation $$I = I_0(T)\{e^{qV/n(T)kT} - 1\} \tag{2}$$

where n(T) is a slowly varying function of T which usually lies in the range $$1 \leq n(T) \leq 2 \tag{3}$$

for moderately high temperatures.

The two limiting values of n(T) in the above inequality are of particular interest. The first corresponds to the situation in which the current is dominated by diffusion, and the second corresponds to the current being dominated by recombination. The former encompasses the behavior of, for instance, a high quality junction in long lifetime material, while the latter rather accurately describes high speed $p^+$-i-$n^+$ switching diodes with short lifetime intrinsic regions.

The majority of junctions belong to neither of these categories, and both $I_0(T)$ and n(T) are complicated functions of the temperature. As a consequence, the forward bias I-V characteristic is also a complicated function of the temperature.

Diode-based thermometry with such non-ideal devices is usually carried out by forward biasing the junction with a constant current and measuring the resulting forward voltage drop as a function of temperature. The device is then supplied with a calibration curve or, alternatively, the calibration data is embodied in a suitable nonlinear network tailored for each individual device. Such a thermometer, which is representative of some commercially available systems, is shown schematically in FIG. 1.

Returning to equation (2), it is clear that if the forward bias current of a diode is switched between the value $I_1$ and $I_2$, with both chosen to be much larger than $I_0$, then $$I_1 = I_0(T)\{e^{qV_1/n(T)kT} - 1\} \quad (4)$$
and
$$I_2 = I_0(T)\{e^{qV_2/n(T)kT} - 1\} \quad (5)$$

Dividing (4) by (5), taking logs and rearranging one has $$T = \left\{\frac{q}{n(T)k\mathrm{Ln}(I_1/I_2)}\right\}(V_1 - V_2) \quad (6)$$

i.e., the dependence on $I_0(T)$ has been removed. In addition, the temperature T is proportional to the voltage difference $(V_1-V_2)$. In practice it has been found that excellent n=2 diodes are readily available, and furthermore this value of n is substantially temperature independent. For such diodes equation (6) therefore yields $$T = \left\{\frac{q}{2k\mathrm{Ln}(I_1/I_2)}\right\}(V_1 - V_2) \quad (7)$$

It is noteworthy that this equation provides a thermometer that is not only linear, but also calculable, i.e. absolute.

Figure 2:
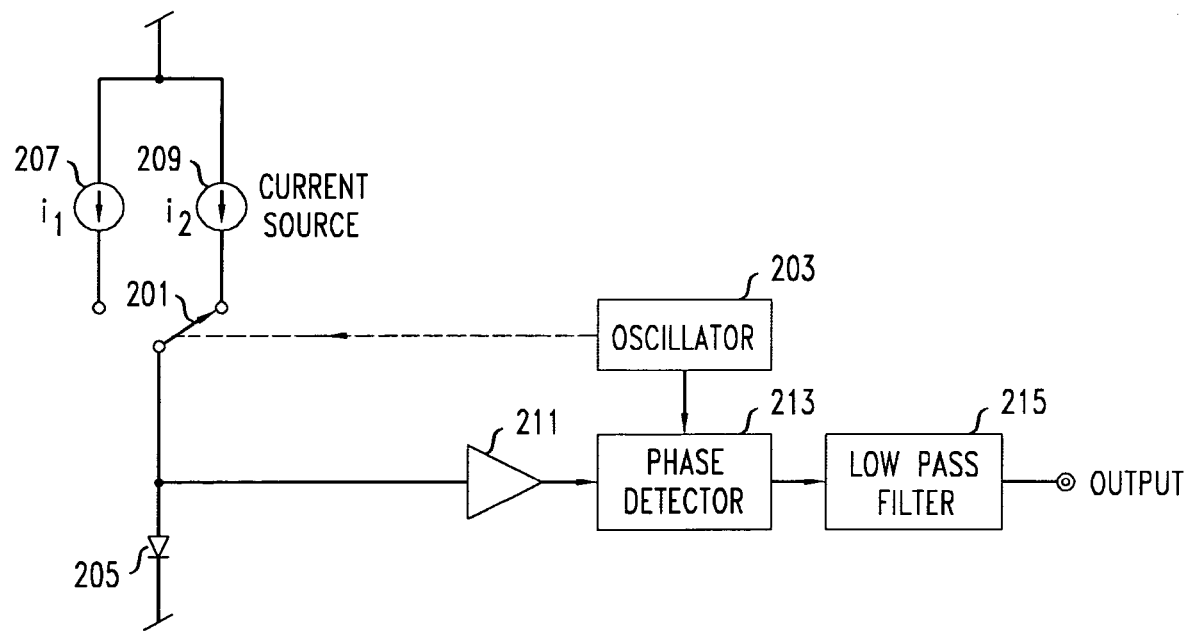
FIG. 2 shows another exemplary diode-based.

The implementation of such a measurement scheme is straightforward and is indicated in FIG. 2, in which switch 201 is driven by oscillator 203, thereby alternately connecting thermometer diode 205 to one of constant current sources 207 and 209 that have a known and stable ratio of the currents they supply. The resulting difference voltage is amplified by amplifier 211. Phase detector 213 determines $V_1$ or $-V_2$, by locking in each voltage value at the appropriate point in time, determined in conjunction with oscillator 203. The result from phase detector 213 when low pass filtered by low pass filter 215 provides the required temperature indication $(V_1-V_2)$ as an output.

Figure 3:
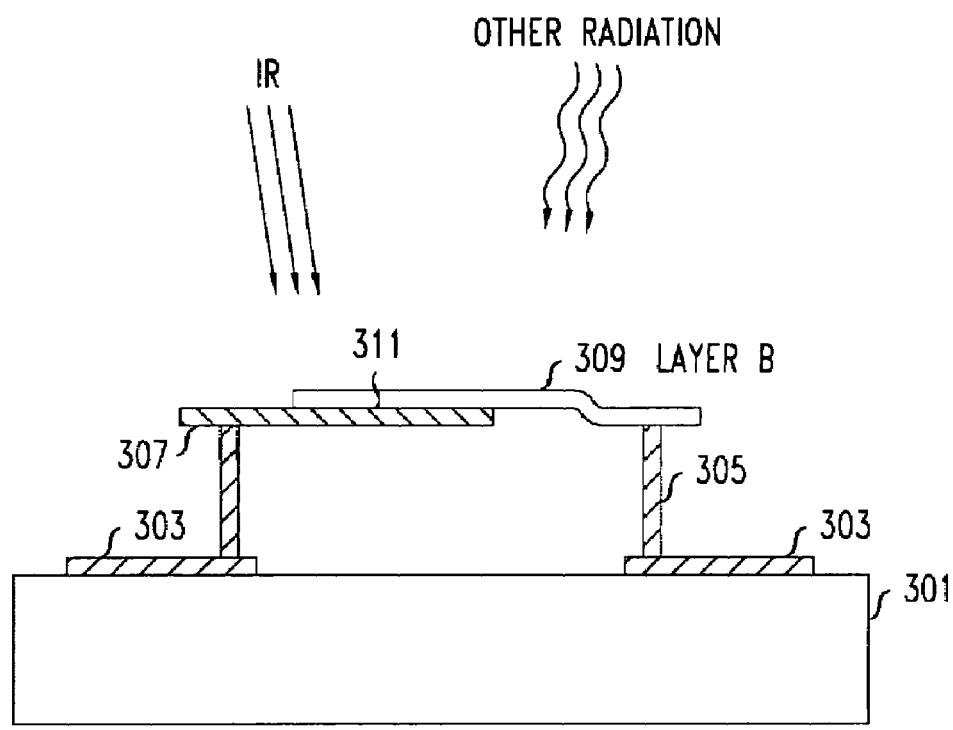
FIG. 3 shows an exemplary diode bolometer that is responsive to at least two distinct spectral bands, in accordance with the principles of the invention.

FIG. 3 shows an exemplary diode bolometer that is responsive to at least two distinct spectral bands, e.g., 1) a) infrared radiation and b) ultraviolet or 2) a) infrared and b) visible light, in accordance with the principles of the invention, in which infrared radiation is absorbed for measurement in the conventional manner of a bolometer and which also makes use of the junction of the diode as a photocell. In FIG. 3, a diode is formed by the overlap of material 307 with material 309, each of which is offset from electrical contacts 303 on substrate 301 by electrically conductive and thermally isolating material 305. Electrical contacts 303 are employed to couple the signal from the diode to the appropriate electronics, which may be located elsewhere on substrate 301, or even on another substrate.

Material 307 and 309 may be any suitable materials that when overlapped form a diode, e.g., a metal and a semiconductor, so as to form a Shottky diode or first and second semiconductors, which may be organic, each of which is appropriately doped so as to form a p-n junction. Note that even when materials 307 and 309 are both semiconductors they need not be the same type of material. Those of ordinary skill in the art will readily recognize that a layer of intrinsic material may be deposited on material 307 so that it is located between materials 307 and 309 to form a p-i-n diode.

In accordance with an aspect of the invention, materials 307 and 309, and any optional insulator therebetween, are preferably selected to obtain a diode that has both adequate performance in absorbing infrared radiation and an ability to generate a large photovoltaic response to the incidence of light of the other band.

For example, if materials 307 and 309 are both semiconductors they preferably should have a direct band gap in order to effectively absorb radiation in the second band, e.g., visible or ultraviolet light. Note that the height of the bandgap will correspond to the band of light that will best be absorbed in accordance with the photovoltaic effect. The height of the band gap can be controlled by selecting the appropriate materials. Material 309 must be thin enough so that it is fairly transparent to the light of interest, in that sufficient light must reach the junction of the diode, i.e., the region between materials 309 and 307, to generate an adequate photovoltaic response.

With regard to infrared radiation, materials 307 and 309 should be such as to absorb infrared radiation, so as to heat the diode junction. However, those of ordinary skill in the art will readily recognize that if materials 307 and 309 by themselves are not able to adequately absorb sufficient infrared radiation, e.g., because they need to be materials that can adequately respond to light of the other band, or layer 309 must be thin enough to permit light of the other band to pass through, additional layers may be added on top of material 309 that are transparent to the other band but are absorbent of infrared radiation. Similarly, rather than depositing one or more transparent layers that absorb infrared radiation on top of material 309, one or more layers that absorb infrared radiation may be deposited below material 307, and these layers need not be transparent to the other band. Note that the purpose of these other layers is to increase the infrared absorption and heating of the diode, and hence causing a greater rise in its temperature, in response to the same level of infrared radiation.

Figure 4:
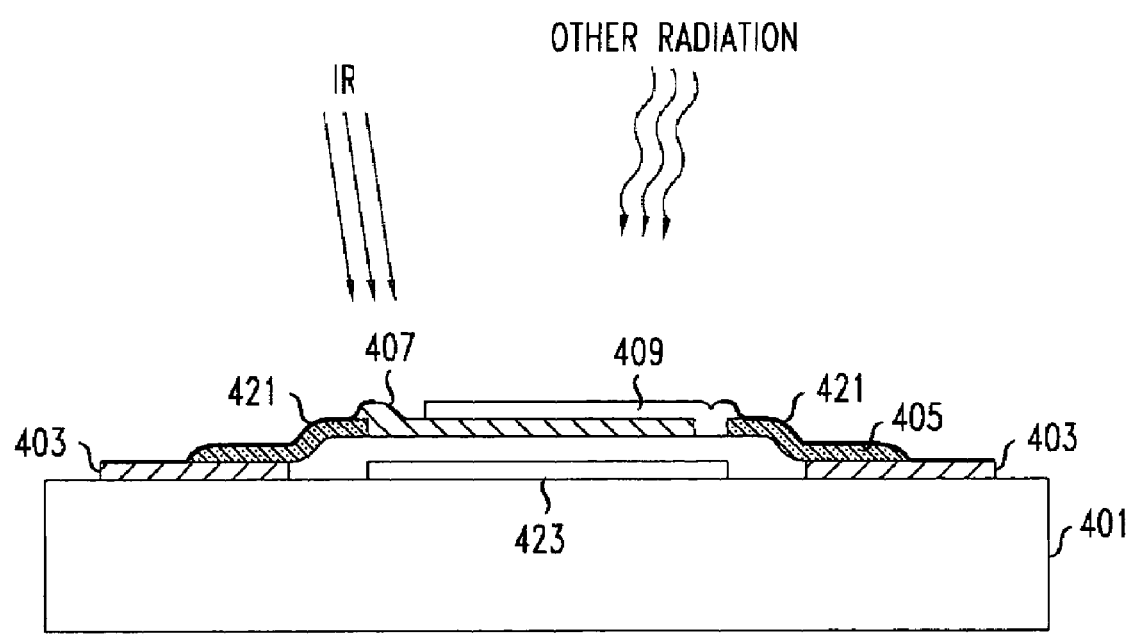
FIG. 4 shows another exemplary diode bolometer that is responsive to at least two distinct spectral bands, in accordance with the principles of the invention, but has some additional features than the exemplary diode bolometer of FIG. 3 and is perhaps easier to manufacture.

FIG. 4 shows another exemplary diode bolometer that is responsive to at least two distinct spectral bands, in accordance with the principles of the invention, but has some additional features than the exemplary diode bolometer of FIG. 3 and is perhaps easier to manufacture. In FIG. 4, a diode is formed by the overlap of material 407 with material 409, each of which is offset from electrical contacts 403 on substrate 401 by electrically insulating and thermally isolating material 405. In order to connect each of materials 407 and 409 to contacts 403, respective conductive, e.g., metal, layers 421 are deposited on each of materials 405.

Materials 407 and 409 may be any suitable materials that when overlapped form a diode. Again, those of ordinary skill in the art will readily recognize that a layer of intrinsic material may be deposited on material 407 so that it is located between materials 407 and 409 to form a p-i-n diode and that, in accordance with an aspect of the invention, materials 407 and 409, and any optional insulator therebetween, are preferably selected to obtain adequate performance in absorbing infrared radiation and an ability to generate a large photovoltaic response to the incidence of light of the other band. Also, material 409 must be thin enough so that it is fairly transparent to the light of interest, in that sufficient light must reach the junction of the diode. To aid in absorbing radiation impinging on the bolometer, reflector 423 is deposited on substrate 401, so that radiation that was not absorbed during its initial pass through materials 409 and 407 will have a second chance to be absorbed after reflection by reflector 423.

Figure 5:
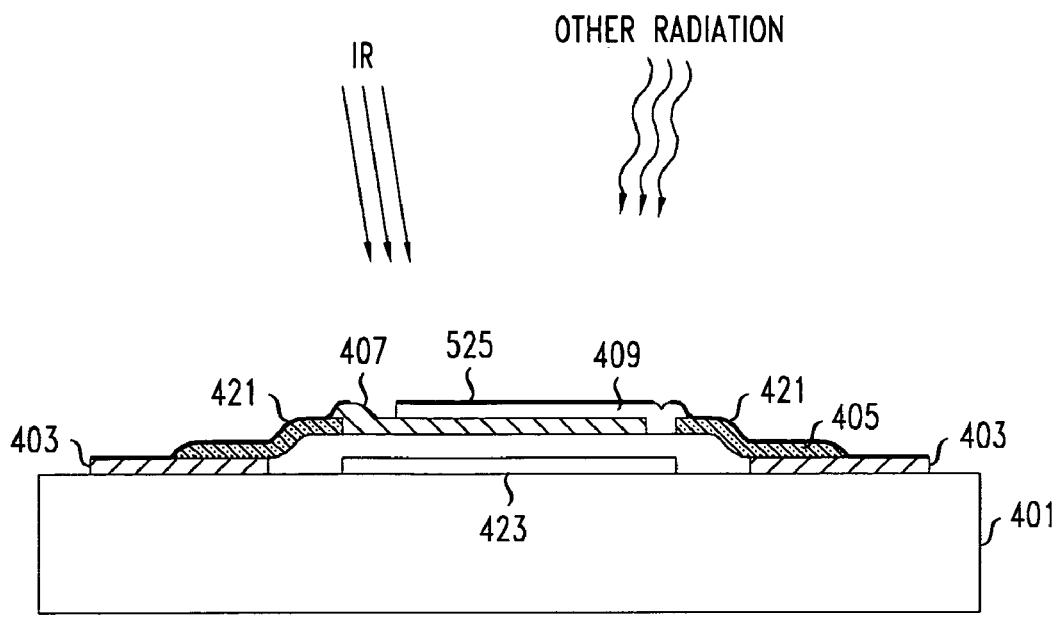
FIG. 5 shows the exemplary bolometer of FIG. 4 but to which infrared absorbing layer has been added.

FIG. 5 shows the exemplary bolometer of FIG. 4 but to which infrared absorbing layer 525 has been added covering the area under which is the overlap of materials 407 and 409. Absorbing layer 525 must be thin enough to permit light of the other band to pass through while being absorbent of infrared radiation.

Figure 6:
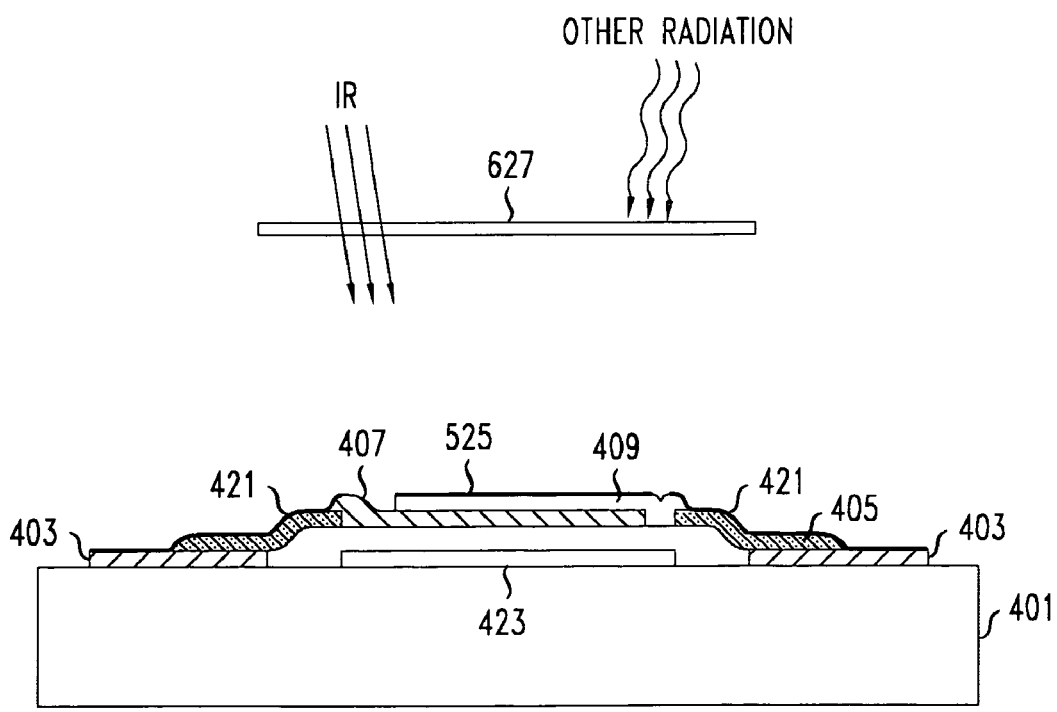
FIG. 6 shows the exemplary bolometer of FIG. 5 but to which a moveable shutter has been added.

FIG. 6 shows the exemplary bolometer of FIG. 5 but to which moveable shutter 627 has been added. Shutter 627 is at least translucent, and preferably substantially transparent, to infrared radiation while substantially blocking radiation of the second band. With shutter 627 in place, the bolometer only receives infrared radiation.

Figure 7:
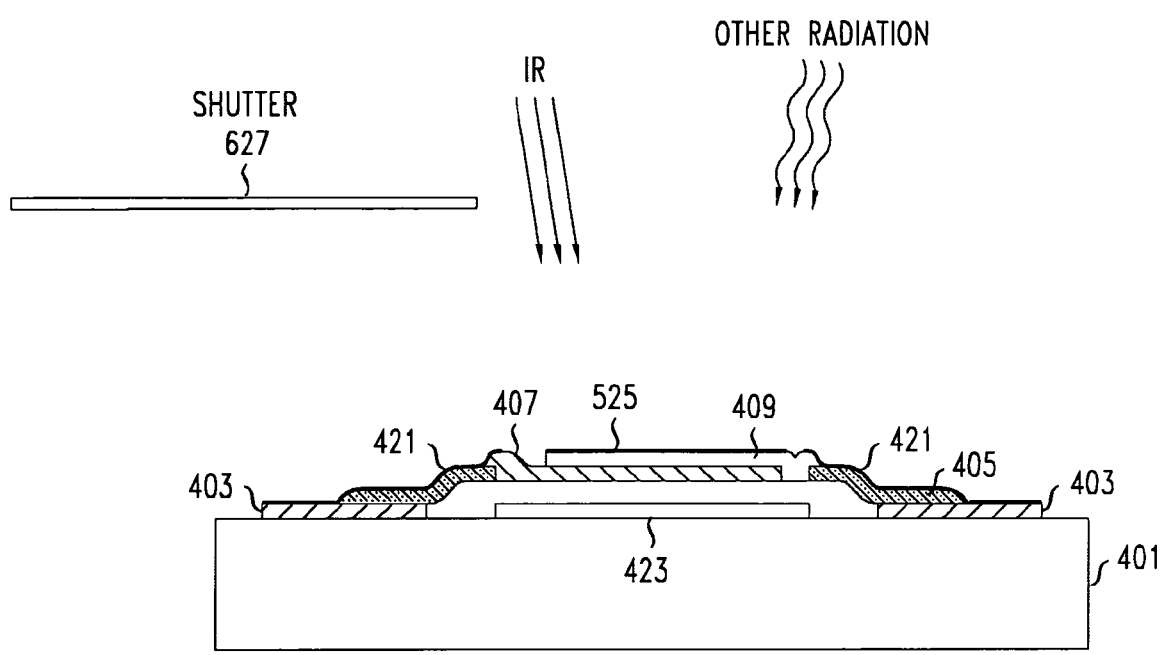
FIG. 7 shows the exemplary bolometer of FIG. 6 but in which the moveable shutter has been moved to an alternate position.

FIG. 7 shows the exemplary bolometer of FIG. 6 but in which moveable shutter 627 has been moved to an alternate position. In the alternate position, shutter 627 no longer blocks radiation of the second band, thus enabling both infrared radiation and radiation of the second band to reach the bolometer. The output of the bolometer is thus the superposition of the temperature effect of the infrared radiation and the photovoltaic effect from the second radiation band.

Note that shutter 627 could be implemented as a spinning wheel with one or more holes in it. When a hole passes in front of the bolometer, the shutter is in the position shown in FIG. 7. Otherwise, the shutter is in the position shown in FIG. 6. This allows the bolometer to read both spectral bands individually.

Figure 8:
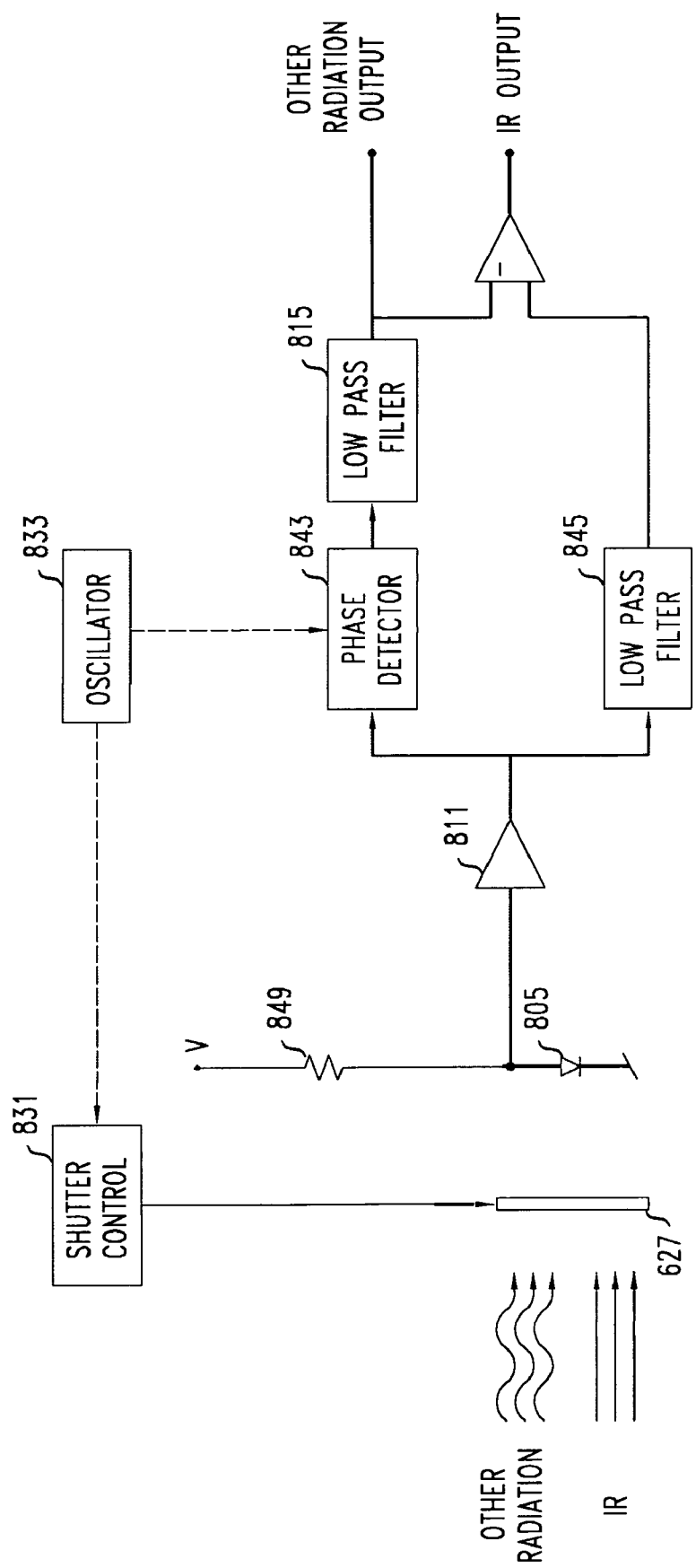
FIG. 8 shows an exemplary arrangement for measuring the distinct spectral bands, in accordance with the principles of the invention.

FIG. 8 shows an exemplary arrangement for measuring both distinct spectral bands, e.g., infrared radiation and ultraviolet or infrared and visible light, to which a bolometer, e.g., the bolometer shown in FIGS. 6 and 7, has been arranged to be sensitive to. The position of shutter 627 is controlled by shutter control 831, which is responsive to oscillator 833. Shutter 627 is alternately located in its positions shown in FIGS. 6 and 7, so that it alternately blocks the noninfrared band of radiation from reaching bolmeter diode 805.

Resistor 849 supplies a bias current to diode 805 while allowing the voltage at the connection point between resistor 849, diode 805 and amplifier 811 to vary based on the impedance of diode 805. Amplifier 811 supplies as an output an amplified representation of the voltage drop across diode 805. Since the effect of the infrared radiation is constantly being measured by the bolometer, as the infrared radiation is always reaching the bolometer, low pass filter 845 supplies as an output the value of the infrared plus one half the value of the contribution of the other band via the photovoltaic effect, assuming a one-half duty cycle for oscillator 833. Conversely, phase detector 843 together with low pass filter 815, similar to phase detector 213 (FIG. 2) and low pass filter 215, supplies as its output one half of the contribution of the other band via the photovoltaic effect. This output can be supplied as representative of the intensity of the radiation of the other band that is incident on the bolometer. The output of low pass filter 815 and low pass filter 845 are supplied to subtractor 847, which supplies as an output simply the contribution of the infrared radiation. The outputs representing the infrared and the output representing the other band may be supplied for further processing, for example, to a nonlinear shaping network or they may be presented as pixel data that is part of an image when the bolometer is part of a sensor made up of an array of such bolometers.

Figure 9:
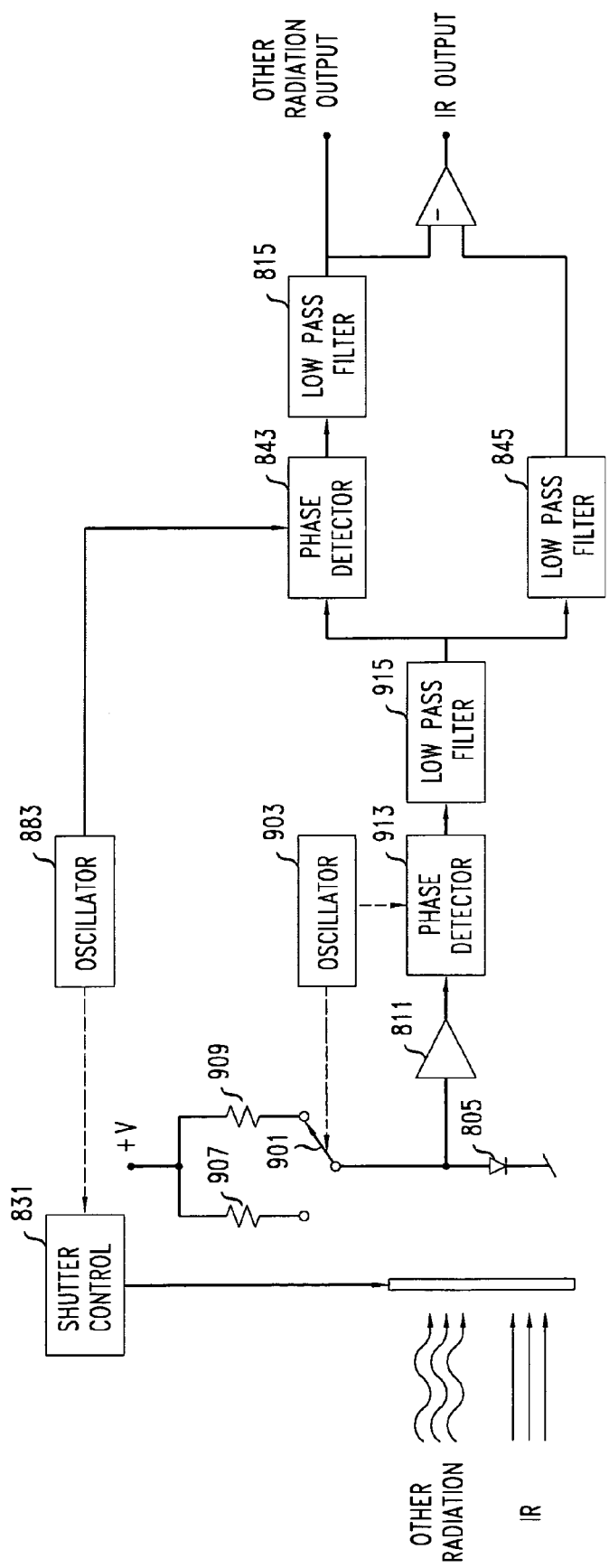
FIG. 9 shows an alternative exemplary arrangement for measuring both distinct spectral bands, which is similar to that shown in FIG. 8, but which eliminates the need for a nonlinear shaping network by implementing a two current sources measuring scheme.

FIG. 9 shows an alternative exemplary arrangement for measuring both distinct spectral bands, which is similar to that shown in FIG. 8, but which employs the technique shown in FIG. 2. As in FIG. 8, the position of shutter 627 is controlled by shutter control 831, which is responsive to oscillator 833. Shutter 627 is alternately located in its positions shown in FIGS. 6 and 7, so that it alternately blocks the noninfrared band of radiation from reaching bolometer diode 805.

Switch 901 is driven by oscillator 903, thereby alternately connecting bolometer diode 805 to one of resistors 907 and 909, which act as current sources having a known and stable ratio of the currents they supply. The voltage at the connection point between switch 901, diode 805 and amplifier 811 varies based on which of resistors 907 and 909 switch 901 is connected to and the impedance of diode 805.

Amplifier 811 amplifies the resulting voltage drop across diode 805 and supplies as an output an amplified representation of the voltage drop across diode 805. Phase detector 913 determines the difference in voltage between a present voltage drop across diode 805 using a first of resistors 907 and 909, e.g., resistor 907, as the current source and a previous, e.g., immediately preceding, voltage drop across diode 805 using a second of resistors 907 and 909, e.g., resistor 909, as the current source, by locking in each voltage value at the appropriate point in time, determined in conjunction with oscillator 903, and performing the subtraction.

The result from phase detector 913 is low pass filtered by low pass filter 915, which provides the temperature reading, with the photovoltaic effect superimposed on it. Note that oscillator 903 typically operates at a higher frequency, e.g., double or greater, than oscillator 833.

Low pass filter 845 receives the temperature reading with the photovoltaic effect superimposed on it as an input, and supplies as an output the value of the infrared plus one half the value of the contribution of the other band via the photovoltaic effect, assuming a one-half duty cycle for oscillator 833. Phase detector 843 together with low pass filter 815, receives the temperature reading, with the photovoltaic effect superimposed on it as an input and supplies as its output a level representative of one half of the contribution of the other band via the photovoltaic effect. The output of low pass filter 815 and low pass filter 845 are supplied to subtractor 847, which supplies as an output simply the contribution of the infrared radiation. The outputs representing the infrared and the output representing the other band may be supplied for further processing.

One of ordinary skill in the art will readily recognize that it is possible to alternatively block infrared and always pass the other band.

Figure 10:
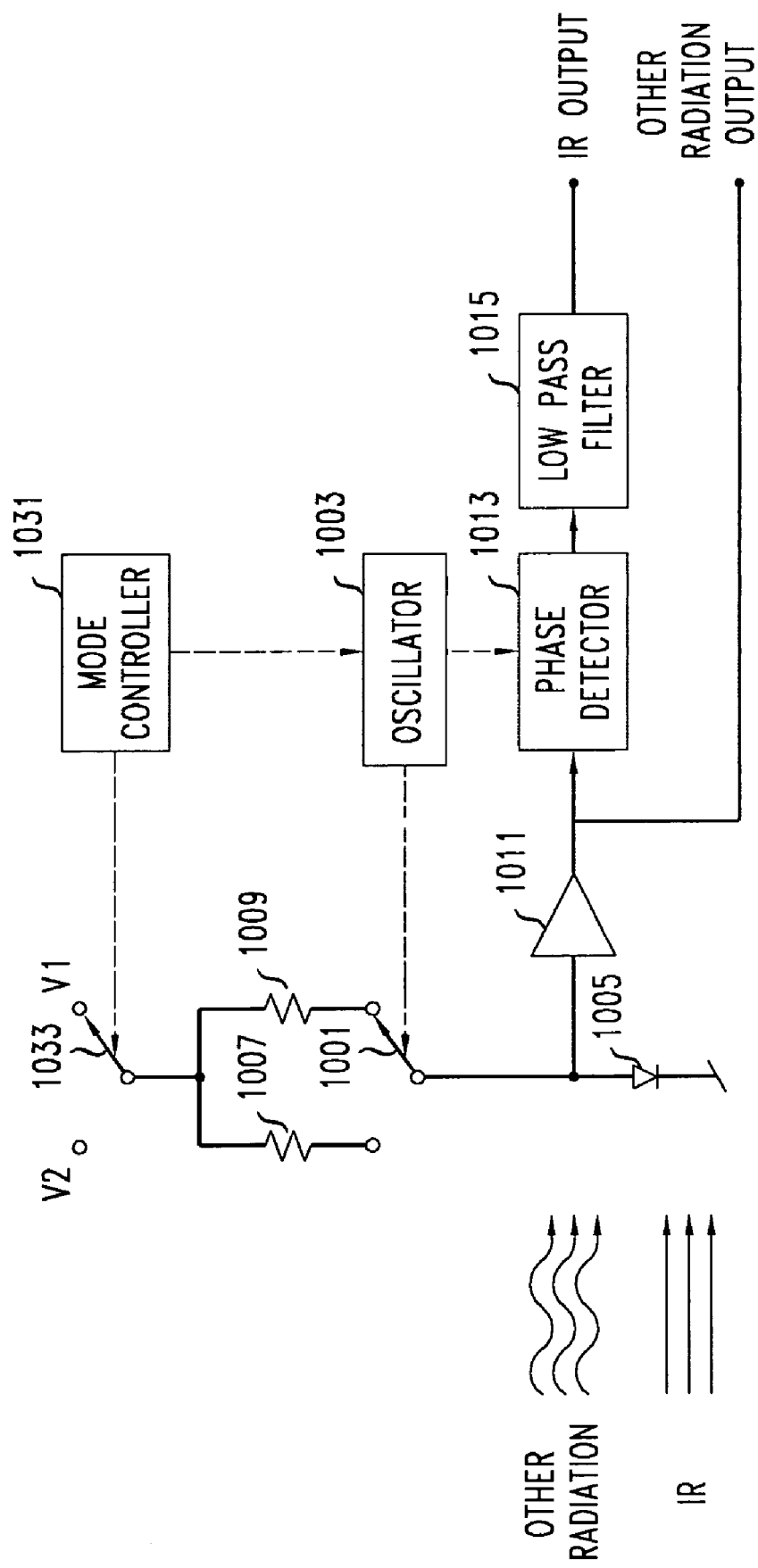
FIG. 10 shows an alternative exemplary arrangement for measuring both distinct spectral bands, which is similar to that shown in FIG. 8, but which does not employ a shutter and does employ the technique shown in FIG. 2.

FIG. 10 shows an alternative exemplary arrangement for measuring both distinct spectral bands, which is similar to that shown in FIG. 8, but which does not employ a shutter and does employ the technique shown in FIG. 2. The position of switch 1033 is controlled by mode controller 1031. Switch 1033 is alternately located between its two possible positions, so that it switches between V1 and V2. V1 is a positive voltage while V2 is ground or, preferably, a small negative voltage, e.g., −0.1 Volt. When switch 1033 is connected to V1, the bolometer will measure the infrared radiation, and when switch 1033 is connected to V2, the bolometer will measure radiation in the other band. The output of switch 1033 is coupled to the common point of connection of resistors 1007 and 1009.

Switch 1001, driven by oscillator 1003, alternately connects bolometer diode 1005 to the connection point of one of resistors 1007 and 1009 that is opposite to their common point of connection. Resistors 1007 and 1009, when coupled to V1, act as current sources having a known and stable ratio of the currents they supply. When switch 1033 is connected to V1, the voltage at the connection point between a) switch 1001, b)

diode 1005, and c) amplifier 1011 varies based on 1) which of resistors 1007 and 1009 switch 1001 is connected to and 2) the impedance of diode 1005.

When switch 1033 is connected to V1, amplifier 1011 amplifies the resulting voltage drop across diode 1005 and supplies as an output an amplified representation of the voltage drop across diode 1005. Phase detector 1013 determines the difference in voltage between a present voltage drop across diode 1005 using a first of resistors 1007 and 1009, e.g., resistor 1007, as the current source and a previous, e.g., immediately preceding, voltage drop across diode 1005 using a second of resistors 1007 and 1009, e.g., resistor 1009, as the current source, by locking in each voltage value at the appropriate point in time, determined in conjunction with oscillator 1003, and performing the subtraction.

The result from phase detector 1013 is low pass filtered by low pass filter 1015, which provides the temperature reading, with the photovoltaic effect filtered out from it. Note that oscillator 1003 typically operates at a higher frequency, e.g., double or greater, than the operating rate of mode controller 1031. Thus, each time switch 1033 is switched to be connected to V1, multiple switches of switch 1001 may be performed, and hence multiple temperature readings may be obtained. Optionally, these may then be averaged to produce a final reading.

When switch 1033 is connected to V2, amplifier 1011, switch 1001 is connected to one of resistors 1007 and 1009, e.g., resistor 1009. Because V2 is either ground or a small negative voltage, diode 1005 is off or reverse biased. As a result, the photocurrent generated in diode 1005 flows from diode 1005 through switch 1001, the resistor to which switch 1001 is connected, and through switch 1033. This flowing photocurrent generates a voltage across the resistor to which switch 1001 is connected, which is supplied to and amplified by amplifier 1011. The output of amplifier 1011 is supplied as the signal representative of the radiation in the noninfrared band. Note that because the diode is either off or reverse biased, the effect on the voltage generated at the point at which diode 1005, amplifier 1011 and switch 1001 are connected due to temperature is negligible.

Although the bolometer has been shown as being made up of only a single diode, those of ordinary skill in the art will readily recognize that multiple diodes connected in series may be employed in the bolometer. Furthermore, in lieu of a diode, a photoconductor may be employed. Note that a photoconductor is a material that changes its electrical resistance as a function of incident light.

What is claimed is:

1. A method of operating a diode-based bolometer, the method comprising the steps of:
    detecting a change in an electrical characteristic of a diode of said diode-based bolometer in response to infrared radiation incident upon said diode; and
    detecting a change in an operating point of said diode in response to noninfrared radiation incident upon said diode.

2. The invention as defined in claim 1 wherein said electrical characteristic is a current-voltage (I-V) curve of said diode.

3. The invention as defined in claim 2 wherein said change in said I-V curve of said diode is caused by a change in temperature of said diode as a result of said infrared radiation being incident upon said diode.

4. The invention as defined in claim 1 wherein said change in said operating point of said diode is a result of a photocurrent that is developed in said diode a in response to said noninfrared radiation being incident upon said diode.

5. The invention as defined in claim 1 wherein said step of detecting a change in an operating point of said diode in response to noninfrared radiation being incident upon said diode further comprises the step of operating said diode as a photocell.

6. The invention as defined in claim 1 wherein said step of detecting a change in an operating point of said diode in response to noninfrared radiation being incident upon said diode further comprises the step of measuring a photocurrent that is the result of electron-hole pairs generated in the junction of said diode in response to said noninfrared radiation being incident upon said diode.

7. The invention as defined in claim 1 wherein said step of detecting a change in said electrical characteristic of said diode further comprises the steps of:
    measuring said electrical characteristic while biasing said diode using a first bias current; and
    measuring said electrical characteristic while biasing said diode using a second bias current that is different from said first bias current.

8. The invention as defined in claim 1 wherein said step of detecting a change in said electrical characteristic of said diode further comprises the steps of:
    measuring said electrical characteristic while biasing said diode using a first bias current that forward biases said diode; and
    measuring said electrical characteristic while biasing said diode using a second bias current that reverse biases said diode.

9. The invention as defined in claim 1 wherein said step of detecting a change in said electrical characteristic of said diode further comprises the steps of:
    measuring said electrical characteristic while biasing said diode using a first bias voltage that forward biases said diode; and
    measuring said electrical characteristic while biasing said diode using a second bias voltage tat biases said diode to be nonforward conducting.

10. Apparatus for detecting radiation in the infrared band and in at least one other band, comprising
    a diode that is responsive to exhibit a change in an electrical characteristic of said diode in response to infrared radiation incident upon said diode and for supplying electron-hole pairs generated by a photovoltaic effect in a junction of said diode; and
    a circuit for determining (i) a magnitude representative of change in an electrical characteristic of said diode exhibited in response to infrared radiation incident upon said diode and (ii) a magnitude representative of a quantity of a photocurrent resulting from electron-hole pairs generated by a photovoltaic effect in said junction of said diode in response to radiation in said other band that is incident upon said diode.

11. The invention as defined in claim 10 further comprising a shutter adapted to selectively pass radiation of one of said infrared band or said other band.

12. The invention as defined in claim 10 wherein said circuit switches between providing a first biasing voltage to said diode and a second biasing voltage to said diode, said first and second biasing voltages being different.

13. The invention as defined in claim 10 wherein said circuit comprises an amplifier for amplifying a voltage drop across said diode.

14. The invention as defined in claim 13 further comprising phase detector coupled to said amplifier.

15. The invention as defined in claim 14 further comprising a low pass filter coupled to said phase detector.

16. A dual-band sensor that provides an indication of incident radiation in a first band and the magnitude of incident radiation in a second, different band, said magnitude of incident radiation in said second band being measured using a photoeffect in the same component used to measure said magnitude of incident radiation in said first band, said magnitude of incident radiation in said first band being measured using an effect other than a photoeffect.

17. The invention as defined in claim 16 wherein said component is a diode.

18. The invention as defined in claim 16 wherein said component is a photoconductor.

19. The invention as defined in claim 16 wherein said effect other than a photoeffect is a temperature dependence effect.

20. The invention as defined in claim 16 wherein said effect other than a photoeffect is a temperature dependence effect of said component's current-voltage (I-V) curve.

* * * * *